Patented Feb. 1, 1949

2,460,772

UNITED STATES PATENT OFFICE 2,460,772

PREPARATION OF OLEONITRILE

Lou A. Stegemeyer, Cincinnati, Ohio, assignor to Emery Industries, Inc., a corporation of Ohio No Drawing. Application May 4, 1948,
Serial No. 25,101

2 Claims. (Cl. 260—465.2)

This invention relates to the preparation of unsaturated nitriles and more particularly to the preparation of oleonitrile from oleic acid.

It has been found that certain salts of oleyl amine are more oil soluble than the corresponding salts of stearyl amine. Since oleyl amine can be produced from oleonitrile and since the amines derived from long chain fatty acids, particularly those which are oil soluble, are effective and valuable assistants in the preparation of rayon and other textile fabrics, a need has arisen for a simple and commercially effective method for the manufacture of the nitriles of unsaturated fatty acids and particularly for the manufacture of oleonitrile.

Stearonitrile can be produced by passing ammonia at low pressures and low rate of flow through heated stearic acid. It is logical that it should be possible to produce oleonitrile from oleic acid in a similar process, by passing ammonia through oleic acid. However, when an attempt is made to produce oleonitrile in the same manner that stearonitrile is produced, an unsatisfactory and impure mixture is produced, which contains a comparatively large amount of high boiling residual material, and has a low iodine value. This nitrile product is unsatisfactory, not only because of its low iodine value, which indicates low yields of unsaturated nitrile, but also because of the difficulty of separating the nitrile produced from other and undesired reaction products.

A satisfactory oleonitrile can be obtained by passing ammonia at low pressures and low flow rate through oleic acid, provided the reaction is stopped at an early stage, before an excessive amount of high boiling residual material has formed. However, when the reaction is stopped at this early stage, large amounts of free acid and amide are present; and the cost of removing oleonitrile and re-working the acid and amide is excessive.

The principal objective of this invention is to produce a commercially feasible method for the preparation of satisfactorily pure oleonitrile of high iodine value. A further object of this invention is to produce the nitriles of other unsaturated fatty acids, by reacting ammonia with the unsaturated fatty acid corresponding to the nitrile to be formed.

Briefly, I have discovered that, although an impure product is obtained from oleic acid when ammonia is slowly passed through acid stock at a low pressure, a very satisfactory yield of oleonitrile can be produced by passing ammonia through oleic acid if the ammonia is passed through the acid at a much higher rate of flow, and pressure then is required in the treatment of stearic acid to form stearonitrile.

The higher operating pressure enables a higher rate of flow of ammonia to be utilized without substantial entrainment or carry over of the reaction materials. If ammonia is not passed through the acid at a high rate of flow, the product formed is of low iodine value and thus contains substantially less unsaturated material than the acid stock. In the preparation of saturated acids, there is no such problem of loss of unsaturation. In other words, this invention is based upon the determination that oleic and other unsaturated acids have a behaviour very different from that of the saturated acids in the production of nitriles by ammoniation.

The best results are obtained when the oleic acid stock is maintained under a relatively high pressure of ammonia; a pressure of at least 50 pounds per square inch and preferably between 100 pounds per square inch and 150 pounds per square inch is used. For proper results, the ammonia must be passed through the stock at a rate of one liter per kilogram of acid per minute and preferably at least twice this rate, i. e. two liters per kilogram of acid per minute. During the reaction the temperature must be carefully controlled and the acid stock should be kept at a temperature above approximately 310° centigrade, but below approximately 340° centigrade, the preferred range being between 320° centigrade and 330° centigrade. When ammonia is bubbled through the oleic acid stock for a period of two and one-half to three and one-half hours under these conditions, a nitrile product is formed which has a relatively high iodine value and contains a relatively small amount of high boiling and residual material and only minor amounts of free acid and amide.

This is distinguished from past stearic acid practice where a low pressure rarely over 30 pounds per square inch and an ammonia flow rate usually under $\frac{1}{10}$ liter per kilogram of stock per minute has been advocated.

No explanation can be offered at the present time for the beneficial results obtained by this procedure. They may be caused by conditions which permit a relatively rapid reaction which limits the length of time the reactants are exposed to the high temperature. On the other hand, they may be due to maintaining a large excess concentration of ammonia in the reaction mix to decrease any tendency for free acid to be present even momentarily, as ammonia soap formed as an intermediate product decomposes.

The invention has been described with references to the production of oleonitrile from oleic acid. However, nitriles of other unsaturated fatty acids may be manufactured by the methods of this invention. Thus, the nitriles of linoleic acid or linolenic acid can be produced from the acids in a manner similar to that described for the production of oleonitrile.

From the foregoing principles of the present invention and from the details of the example which follows, those skilled in the art readily will comprehend other modifications to which the present invention is susceptible.

Example

A thousand parts of oleic acid (good commercial low titre grade) were held at a temperature of 320° centigrade and under 120 pounds per square inch pressure while passing gaseous ammonia through at the rate of 2 liters of ammonia gas per kilogram of acid per minute for three hours. The product contained only 0.3 per cent free acid, 5 per cent amide, 7 per cent high boiling and residual material and had an iodine value of 95. The oleic acid used gave about 4 per cent residue on distilling in same manner as in recovering the residue in this example.

If ammonia pressures below 30 pounds per square inch are used, or temperatures above 355° centigrade, or ammonia flow rates slower than one liter per kilogram per minute, the high boiling and residual material may amount to 20 per cent or more and the iodine value of the distilled nitrile product may be less than 70 for the same free acid and amide contents as in the example.

Higher pressures and rates of ammonia flow than shown, may be used but have been found to be of no advantage and tend to make the process less economical.

The use of dehydrating catalysts is not excluded in the practice of this invention although their use is not necessary and their presence in some cases is undesirable because of the difficulty of removal and their tendency to produce other effects than dehydration, i. e. polymerization.

In this disclosure, the terms oleonitrile and oleic acid are used to indicate the commercial products rather than the pure compounds. The oleic acid used in the example was a high quality commercial grade of low titre (4.3° centigrade).

In the preparation of oleonitrile, the temperature, ammonia pressure, and ammonia flow rate greatly affect the quality of the product as well as the time required to reach a low free fatty acid and amide content. If the reaction is carried out maintaining these factors within the limits set out, a nitrile of good quality is obtained having a high iodine value, a low residue on distillation, and a low free fatty acid and amide content.

Preparation of oleonitrile of such quality represents a considerable improvement over that obtainable by operating under conditions other than those specified, which would be quite suitable for preparation of saturated nitriles, such as stearonitrile.

Having described my invention, what I claim as novel and desire to protect by Letters Patent of the United States is:

1. A method for preparing oleonitrile from the reaction of oleic acid stock with ammonia comprising passing gaseous ammonia through liquid stock at a pressure of between 100 pounds per square inch and 150 pounds per square inch and a rate of flow of substantially two liters per kilogram of stock per minute for a period of between two and one-half and three and one-half hours, the stock being maintained at a temperature between 320° centigrade and 330° centigrade.

2. A method for preparing oleonitrile from the reaction of oleic acid stock with ammonia comprising passing gaseous ammonia through liquid stock at a pressure of between 100 pounds per square inch and 150 pounds per square inch and a rate of flow of substantially two liters per kilogram of stock per minute for a period of between two and one-half and three and one-half hours, the stock being maintained at a temperature between 310° centigrade and 340° centigrade.

LOU A. STEGEMEYER.

REFERENCES CITED

The following references are of record in the file of this patent:

UNITED STATES PATENTS

| Number | Name | Date |
|---|---|---|
| 2,061,314 | Ralston et al. | Nov. 17, 1936 |
| 2,435,553 | Bruson et al. | Feb. 3, 1948 |